May 8, 1934.  W. J. SIMONDS  1,957,619
ADJUSTABLE REEL FOR DYE KETTLES AND THE LIKE
Filed June 10, 1932  2 Sheets-Sheet 1

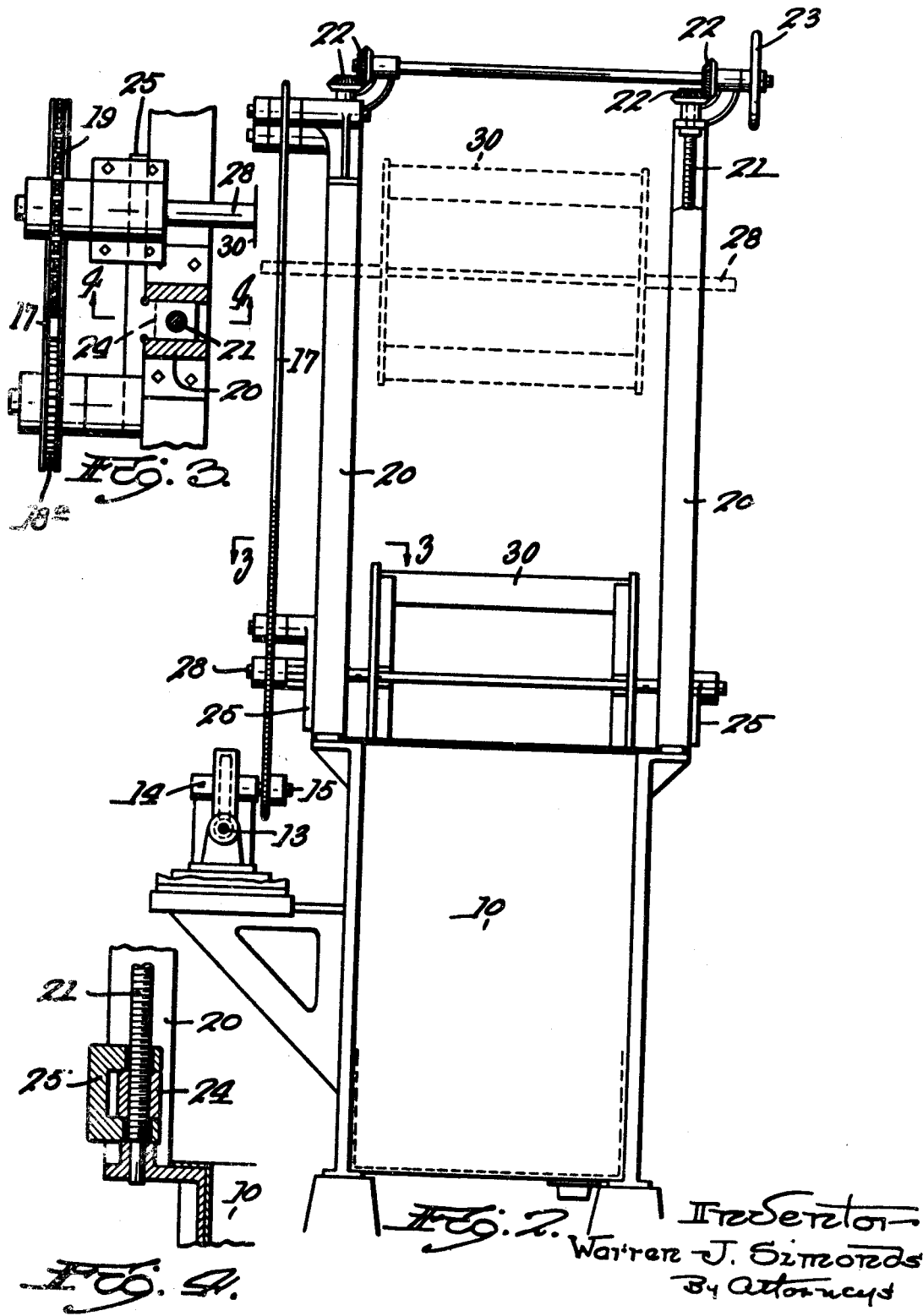

Patented May 8, 1934

1,957,619

UNITED STATES PATENT OFFICE 1,957,619

ADJUSTABLE REEL FOR DYE KETTLES AND THE LIKE

Warren J. Simonds, Orange, Mass., assignor to Rodney Hunt Machine Company, Orange, Mass., a corporation of Massachusetts Application June 10, 1932, Serial No. 616,508

2 Claims. (Cl. 8—19)

This invention relates to machine dye kettles for dyeing cloth in the piece, bleaching machines, washing machines, and the like.

The principal objects of the invention are to provide means whereby the reel, ordinarily used in the kettles or vats of such machines, can be adjusted to different heights; to provide means whereby this adjustment can be made while this machine is in operation; to provide for the handling of pieces of cloth of various lengths, whereby short pieces of cloth can be dyed without the use of the usual cotton leader, thus eliminating guess work and a certain amount of time in the preparation of the pieces to go into the machine, and to provide a variable speed transmission from the motor to the reel driving train which allows the reel to be operated at from four to forty revolutions per minute in order to prevent uneven dyeing in the early stages.

Other objects and advantages of the invention will appear hereinafter.

Reference is to be had to the accompanying drawings, in which

Fig. 2 is an end view of the same;

Fig. 3 is a sectional view on the line 3—3 of Fig. 2, showing the operating chain and frame work, and Fig. 4 is a sectional view on the line 4—4 of Fig. 3, showing one of the adjusting screws.

Figure 1:
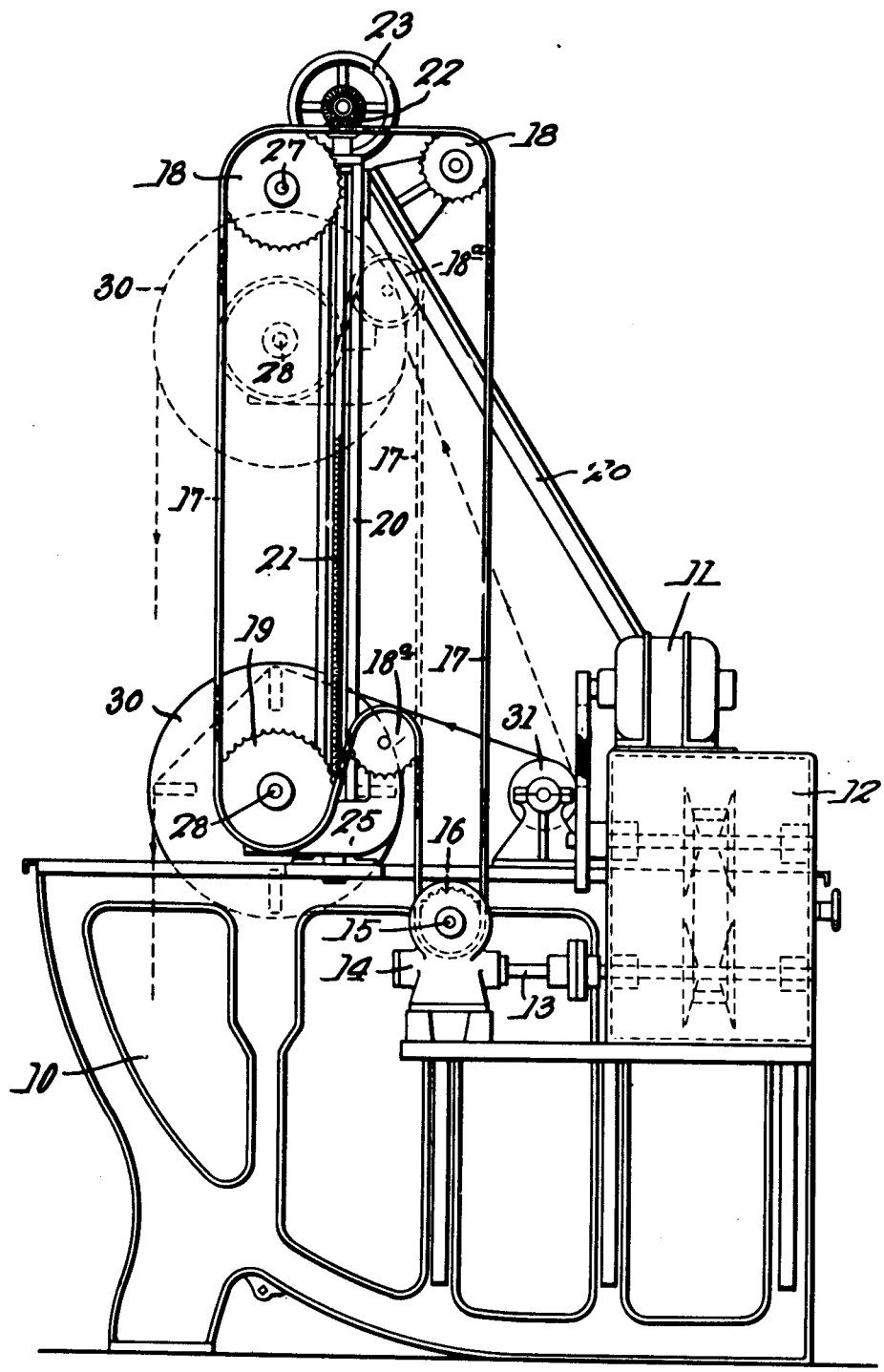
Fig. 1 is a side view of a well known dye kettle with a preferred form of this invention applied thereto.

As stated, the invention is shown as applied to a well known type of dye kettle 10 which, except for certain features, is the same as all ordinary dye kettles and is intended to perform the same work with certain advantages.

On a convenient place on this dye kettle is mounted a motor 11 which, through a variable speed transmission 12, drives a shaft 13. This shaft, through a speed reducer 14, drives a shaft 15 on which is a sprocket 16. This sprocket drives an endless chain 17 which passes over several sprocket guide wheels 18 and a sprocket 19 for driving the reel. Mounted on the dye kettle 10 is a fixed frame 20 carrying the sprockets 18 on fixed centers and two vertical screws 21 projecting up from the top of the dye kettle. These screws are connected by bevel gears 22 with a hand wheel shaft 23 by which the two screws can be turned. Each screw is provided with a nut 24 which is mounted on a slidable frame 25 that moves up and down the guide frame 20 in accordance with the adjustments made by the hand wheel. On this frame 25 are mounted the sprocket 19 and a guide sprocket 18ª. The two large sprockets 18 and 19 are mounted on shafts 27 and 28, the shaft 27 being stationary and the shaft 28 being mounted on the frame 25 and movable up and down with it.

The shaft 28 carries a reel 30 of the usual type but, as the reel, of course, moves up and down for adjustment by the operation of the hand wheel, this reel can be brought to any desired position for the purpose of shortening or lengthening the path over which the goods pass outside the kettle. The goods come up over a drum 31 and pass directly to this reel. When the reel is in the upper position, shown in dotted lines in Fig. 1, the path of the cloth is comparatively long. It extends upwardly from the drum 31 and then downwardly into the tub. When the reel is in the lowermost position, shown in full lines in Fig. 1, the path of the cloth is comparatively short as it comes nearly horizontally to the reel and then down.

It will be seen that the reel can be adjusted while the machine is running. This is of great advantage because when first adjusting any new piece of goods, the operator cannot tell just how high he should have the reel located. Now he can make his adjustment after the goods get into the water and the change takes place in its length. This eliminates the guess work that would be required if the reel were merely adapted to be placed in two or three different positions, one over the other. This adjustment of the reel, on account of the arrangement of the sprocket chain, does not affect the driving of the reel. This form of adjustment also, of course, avoids the necessity of stopping the reel and moving it from one position to another.

The variable speed arrangement 12 is of an ordinary type, in fact any type could be used, but it enables the operator to run the reel at different speeds according to the different conditions existing and particularly prevents uneven dyeing during the early stages of operation owing to the fact that the dye liquor is not evenly mixed. At that time the cloth is run through rapidly and, after the dye is evenly distributed, the speed is reduced to normal. Also short pieces can be dyed without the use of cotton leaders. These pieces react differently from the pieces being dyed and in the past gave a false indication of the process going on. The elimination of the cotton leaders eliminates guess work. On account of the facility with which the operator can change the length of the path of the goods out of the dye kettle, pieces of ordinary length can be dyed without these leaders. The invention can be applied also to the vats or kettles of washing and bleaching machines and the like.

Although I have illustrated and described only one form of the invention I am aware of the fact that modifications can be made therein by any person skilled in the art without departing from the scope of the invention as expressed in the claims. Therefore, I do not wish to be limited in this respect otherwise than as set forth in the claims, but what I do claim is:

1. The combination with a kettle, of a vertical frame extending up from the top thereof, a series of wheels supported in stationary position, a vertically sliding frame carried by the first named frame, a single means for adjusting said frame as a whole up and down, wheels located on the sliding frame, a power operated flexible driving member engaging all of said wheels to drive them, a reel carried by, and movable up and down with, the sliding frame, whereby the length of the total course of travel of the cloth can be regulated, one of said stationary wheels being connected with a source of power to drive said flexible connection, and one of the movable wheels being driven by the flexible connection and being connected to rotate the reel.

2. The combination with a kettle, of a frame extending up from the top thereof, a sliding frame carried by the first named frame, means for adjusting the sliding frame up and down while the machine is in operation, a reel carried by, and movable up and down with, the sliding frame, and means located in fixed position for guiding the fabric to the top of said reel in all its positions, the fabric resting freely and loosely on the bottom of the kettle between the reel and guiding means, whereby the length of the course of travel of the cloth above the top of the kettle can be regulated, without changing the length of the space covered by the loose fabric on the bottom of the kettle.

WARREN J. SIMONDS.